(No Model.)
F. REYNER.
PLOW.
No. 336,946.    Patented Mar. 2, 1886.
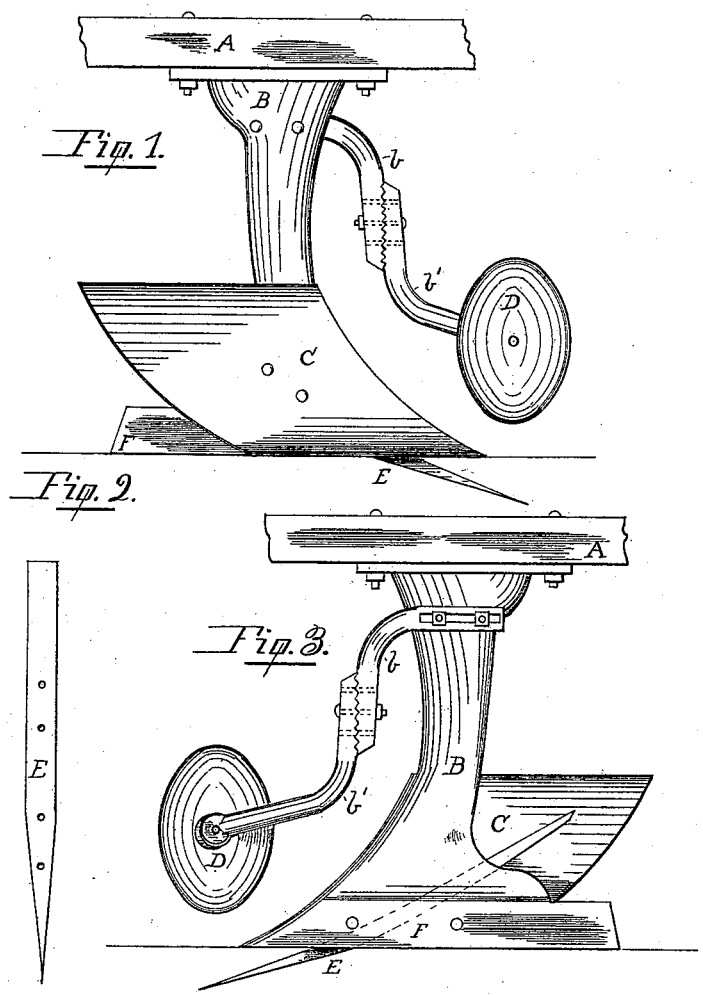
Witnesses,
Ethw B. Stowe
Daniel H. Berdine
Inventor,
Francis Reyner
By Joshua B. Webster Atty.

UNITED STATES PATENT OFFICE.

FRANCIS REYNER, OF LATHROP, CALIFORNIA.

PLOW.

SPECIFICATION forming part of Letters Patent No. 336,946, dated March 2, 1886.

Application filed July 28, 1885. Serial No. 172,852. (No model.)

*To all whom it may concern:*

Be it known that I, FRANCIS REYNER, a citizen of the United States, residing at Lathrop, in the county of San Joaquin and State of California, have invented certain new and useful Improvements in Plows, of which the following is a specification, reference being had therein to the accompanying drawings.

My invention consists in certain attachments to the standard of the plow, whereby the soil may be stirred to a greater depth, and the weeds and stubble entirely plowed under.

To more fully explain my invention, reference is had to the accompanying drawings, forming a part of the specification, in which—

Figure 1 is a right-hand elevation of a plow, showing my improvements. Fig. 3 is a left-hand elevation of the same. Fig. 2 is a detached view of the subsoiler.

Similar letters of reference indicate corresponding parts.

A is the beam of a plow, to which is attached the standard B, to which is attached the mold-board C, which is made, preferably, with two edges, so that when one edge is dull it may be reversed, and the other edge used. The two bolts which attach the mold-board C to the standard B are of sufficient length so as to fasten a subsoiler, E, to the back side of the standard. This subsoiler E projects any desired proper distance below the mold-board C, and serves to stir up the soil below the furrow proper. It is made with one end chisel-shaped and the other pointed, and is reversible, so that either end may be brought into use.

In plowing weedy lands it often happens that a small ridge of land is left between the furrows unturned by the mold-board. To obviate this and remove the ridge and throw the weeds in front of the plow, to be plowed under in the furrow, I attach a forwardly-extending stem to the standard, near its head. This stem is composed of two portions, $b$ the upper, and $b'$ the lower portion. The head of the upper portion is furnished with a slot, and is bolted to the standard B by bolts passing through such slot. The lower portion, $b'$, of stem has at its foot an eye, through which is inserted the axle of a revolving disk, D, set at an angle so as to scale off as it revolves a slice of soil in front of the plow and throw it in front of the plow, to be buried with such weeds or stubble as may be in the soil so removed. The stem portion $b'$ is bolted to the stem portion $b$, having a series of holes for the reception of the bolt. The slot in the head of stem portion $b$ permits of the setting of the disk D to or from the point of the plow, as may be desired, while the bolt-holes in the head of portion $b'$ permit the vertical raising or lowering of the stem portion $b'$, giving the requisite depth in the soil of disk D. F is the landside-bar of the plow.

Having thus described my invention, what I claim as new, and desire to secure by Letters Patent, is—

1. The combination of the plow with the colter D, which is placed at an angle in front of the plow, so as to cut off the corner of the land in front of the plow, substantially as shown.

2. The combination of the plow, the adjustable stem $b\ b'$, and the revolving colter D, which is set obliquely to the plow, substantially as described.

In testimony whereof I affix my signature in presence of two witnesses.

FRANCIS REYNER.

Witnesses:
J. B. WEBSTER,
ELIHU B. STOWE.